(12) United States Patent
Ritz et al.

(10) Patent No.: US 6,588,858 B2
(45) Date of Patent: Jul. 8, 2003

(54) VEHICLE

(75) Inventors: Steffen Ritz, Kirchheim/Neckar (DE); Stefan Steiner, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/881,975

(22) Filed: Jun. 15, 2001

(65) Prior Publication Data

US 2002/0060103 A1 May 23, 2002

(30) Foreign Application Priority Data

Jun. 16, 2000 (DE) .......................... 100 29 819

(51) Int. Cl.$^7$ ................................. B60T 8/24
(52) U.S. Cl. ..................................... 303/140
(58) Field of Search ..................... 303/140; 180/248; 701/41

(56) References Cited

U.S. PATENT DOCUMENTS

| | | | |
|---|---|---|---|
| 5,134,352 A | * 7/1992 | Matsumoto et al. | 318/587 |
| 5,172,961 A | * 12/1992 | Inoue et al. | 303/100 |
| 5,228,757 A | * 7/1993 | Ito et al. | 303/100 |
| 5,267,783 A | * 12/1993 | Inoue et al. | 303/111 |
| 5,388,658 A | * 2/1995 | Ando et al. | 180/197 |
| 6,021,367 A | * 2/2000 | Pilutti et al. | 701/41 |
| 6,059,067 A | * 5/2000 | Shibahata et al. | 180/338 |
| 6,076,033 A | * 6/2000 | Hamada et al. | 701/70 |
| 6,132,014 A | * 10/2000 | Kiso et al. | 303/146 |
| 6,154,688 A | * 11/2000 | Dominke et al. | 701/1 |
| 6,208,929 B1 | * 3/2001 | Matsuno et al. | 701/89 |
| 6,216,081 B1 | * 4/2001 | Tabata et al. | 701/87 |
| 6,250,448 B1 | * 6/2001 | Salecker et al. | 192/103 F |
| 6,286,915 B2 | * 9/2001 | Matsuno | 303/146 |
| 6,360,153 B1 | * 3/2002 | Shnimura et al. | 701/48 |
| 6,366,833 B1 | * 4/2002 | Fukuyama | 701/1 |

FOREIGN PATENT DOCUMENTS

| | | |
|---|---|---|
| DE | 36 37 481 | 9/1987 |
| DE | 36 25 025 | 10/1987 |
| DE | 42 24 887 | 9/1993 |
| EP | 0 295 396 | 12/1988 |
| EP | 0 863 063 | 9/1998 |

* cited by examiner

Primary Examiner—Jack Lavinder
Assistant Examiner—Benjamin A Pezzlo
(74) Attorney, Agent, or Firm—Kenyon & Kenyon

(57) ABSTRACT

A vehicle includes four wheels, a drive axle, a power train which connects a vehicle engine to the drive axle via a transmission, a clutch, and an axle differential, a brake system, which may brake at least the wheels associated with the drive axle independently of the other wheels, a steering system which includes a manual steering device, at which a driver may set a steering angle for steerable wheels, and a control system, which brakes at least the drive axle wheel inside the curve and generates a steering-supporting braking torque on this wheel below a predefined vehicle velocity and as of a predefined steering angle. In order to improve the steering support, the control system monitors the status of the transmission and/or the clutch, the control system actuating the brakes of the appropriate wheel as a function of this status in order to generate the steering-supporting braking torque.

27 Claims, 1 Drawing Sheet

VEHICLE

FIELD OF THE INVENTION

One advantage of the arrangement for generating steering-supporting braking torques $M_B$ and/or steering-supporting drive torques $M_A$ according to the present invention is the fact that this arrangement may be integrated in the electronic traction control system of vehicle 1 at a relatively low cost. Systems such as ABS, ASR, ESP are already standard in today's vehicles.

The present invention relates to a vehicle.

BACKGROUND INFORMATION

European Published Patent Application No. 0 295 396 describes a vehicle that includes at least four wheels, at least one drive axle, one power train which connects a vehicle engine to the drive axle via a transmission, a clutch, and an axle differential, a brake system, which allows each wheel to be braked independently of the other wheels, a steering system, which has a manual steering device such as a steering wheel, at which a driver can set a steering angle for the steerable wheels, and a control system, which brakes at least the drive axle wheel inside the curve below a certain vehicle velocity, for example, 25 km/h, and as of a certain steering angle, for example, 90% of the maximum steering angle, and generates a steering-supporting braking torque on this wheel. In such a vehicle, single-sided braking of the vehicle can thus be performed through which a yaw moment into the curve to be traveled can be generated. The steering action set by the steering angle can thus be supported.

In such a vehicle, steering-supporting braking sequences are implemented using devices that are already present in the vehicle. For example, such a steering-supporting brake system may be constructed using components of an antilock braking system or a traction control system.

German Published Patent Application No. 36 37 481 describes a motor vehicle, in particular a tractor, equipped with a steering brake system in order to implement extremely small turning radii for the vehicle. In this vehicle, a steering brake reversing valve is arranged so that it is functionally linked to a steering system of the motor vehicle, the steering brake reversing valve being activated by the steering system for a certain steering angle of the steered wheels. The wheel of the driven rear axle inside the curve is braked to achieve a steering-supporting braking torque.

Furthermore, German Published Patent Application No. 42 24 887 describes a vehicle, in particular a farm tractor, which includes an electrical and/or electronic controller which issues control signals to pressure medium-controlled brakes of the drive axle wheels, as a function of the steering angle, so that when a predefinable limit steering angle is exceeded, the rear axle wheel inside the curve is braked. Using these measures, the track arc diameter is reduced when traveling around a curve. The steering device preferably sets this steering-supporting braking action so that it continuously increases with an increasing steering angle.

If the left- and right-hand wheels are driven via an axle differential, which can be locked by a differential lock, it is advantageous if the locking action is suspended automatically by the electrical controller if in such a vehicle the controller issues a braking signal to one of the brakes to support steering.

It is an object of the present invention to provide a vehicle in which the steering-supporting action of the brake intervention is improved.

SUMMARY

The present invention is based on the concept of taking into account the status of the transmission gear contained in the power train and, additionally or as an alternative, the status of the clutch contained in the power train when setting the intensity of the steering-supporting braking torque. For example, if the clutch is disengaged and/or when the gear is set to neutral, the steering-supporting action may be improved if a different, in particular, stronger braking action is generated on the wheel inside the curve than when the vehicle is in gear and the clutch is engaged.

By taking into account the status of the transmission and/or the clutch, the steering-supporting action of the braking torque generated may thus be improved.

The clutch may be controlled by a control system, the control system causing the clutch to be engaged if the clutch is disengaged in order to generate the steering-supporting braking torque. Taking into account the status when setting the intensity of the braking forces is thus also manifested in the clutch being engaged if required.

In another example embodiment of the present invention, the transmission may be controlled by a control system, the control system causing a gear to be engaged if the transmission was in neutral in order to generate the steering-supporting braking torque, a control system activating the clutch accordingly. In this example embodiment, taking into account the status of the clutch and the transmission is manifested in a gear being automatically engaged by the control system if the transmission was in neutral.

The control system may activate the engine, the transmission, and the clutch in order to generate the steering-supporting braking torque so that a steering-supporting drive torque is additionally generated on the drive axle wheel outside the curve. By this measure, in addition to the braking torque generated on the drive axle wheel inside the curve, an additional drive torque is generated on the drive axle wheel outside the curve, whereby the resulting steering torque may be increased. A dynamic driving situation (e.g., acceleration of the vehicle) intended by the driver may also be taken into account in a suitable manner.

In a vehicle having a power train equipped with a controllable clutch and a controllable transmission, in particular with an automatic transmission having a torque converter, driving situations may arise in which the clutch and/or the transmission are operated so that no engine torque is transmitted to the drive axle. In such a driving situation, the above-mentioned aspect of the present invention is particularly noticeable, since when traveling along a, e.g., sharp, curve, the engine, transmission, and clutch may be controlled so that an engine torque is transmitted to the drive axle, the braking of the wheel inside the curve in conjunction with the axle differential resulting in the additional drive torque being generated on the wheel outside the curve. Even in other operating states of the vehicle in which an engine torque is transmitted to the drive axle through the engaged clutch and through an engaged gear, the present invention may generate an additional drive torque on the wheel outside the curve by adjusting the engine torque accordingly.

The achievable steering torque may be increased by the fact that the control system additionally brakes the wheel inside the curve of at least one non-driven axle, generating a steering-supporting braking torque thereon.

The control system may activate the engine and the clutch in order to support steering so that the variation of the sum of the drive torques generated on the drive axle wheels over time is constant. This arrangement may prevent vehicle responses that are unexpected by the driver.

In a vehicle that is equipped with an activatable additional drive axle, the control system may activate the additional drive axle and a steering-supporting braking torque may also be generated on the wheel inside the curve of the activatable drive axle and a steering-supporting drive torque may be generated on the wheel outside the curve of the activatable drive axle in order to achieve steering support. With this measure, in vehicles with a plurality of drive axles, for example, off-road vehicles or all-wheel drive vehicles, the turning radius, for example, for parking or maneuvering, may be significantly reduced.

A center differential may be provided, which causes the rotational speed to be distributed between the driven front axle and the driven rear axle, this center differential having a differential lock that may be controlled by the control system, the control system operating this differential lock in order to lock the center differential and generate the steering-supporting drive torques. With this measure, constant speed ratios may be guaranteed at the front axle and the rear axle in order to achieve reproducibility of the steering-supporting action of the brake interventions and of drive torque generation.

According to an example embodiment of the present invention, in a vehicle having an electronic traction control system, for example, ABS, ASR, ESP, the control system may be integrated in this traction control system in terms of its hardware and/or implemented in this traction control system in terms of its software. With this measure, in a vehicle having a traction control system, a steering-supporting braking torque, for example, in order to reduce the turning radius or improve maneuverability, may be implemented without requiring additional units to be installed in the vehicle. In the simplest case, it is sufficient to implement a software module in the traction control system. This arrangement makes it possible to retrofit the steering braking system function in a vehicle having a traction control system with minimum expenditure.

It should be understood that the above-named features and those to be explained in detail below may be used not only in the combination described, but also in other combinations or by themselves without departing from the scope of the present invention.

DETAILED DESCRIPTION

Figure 1:
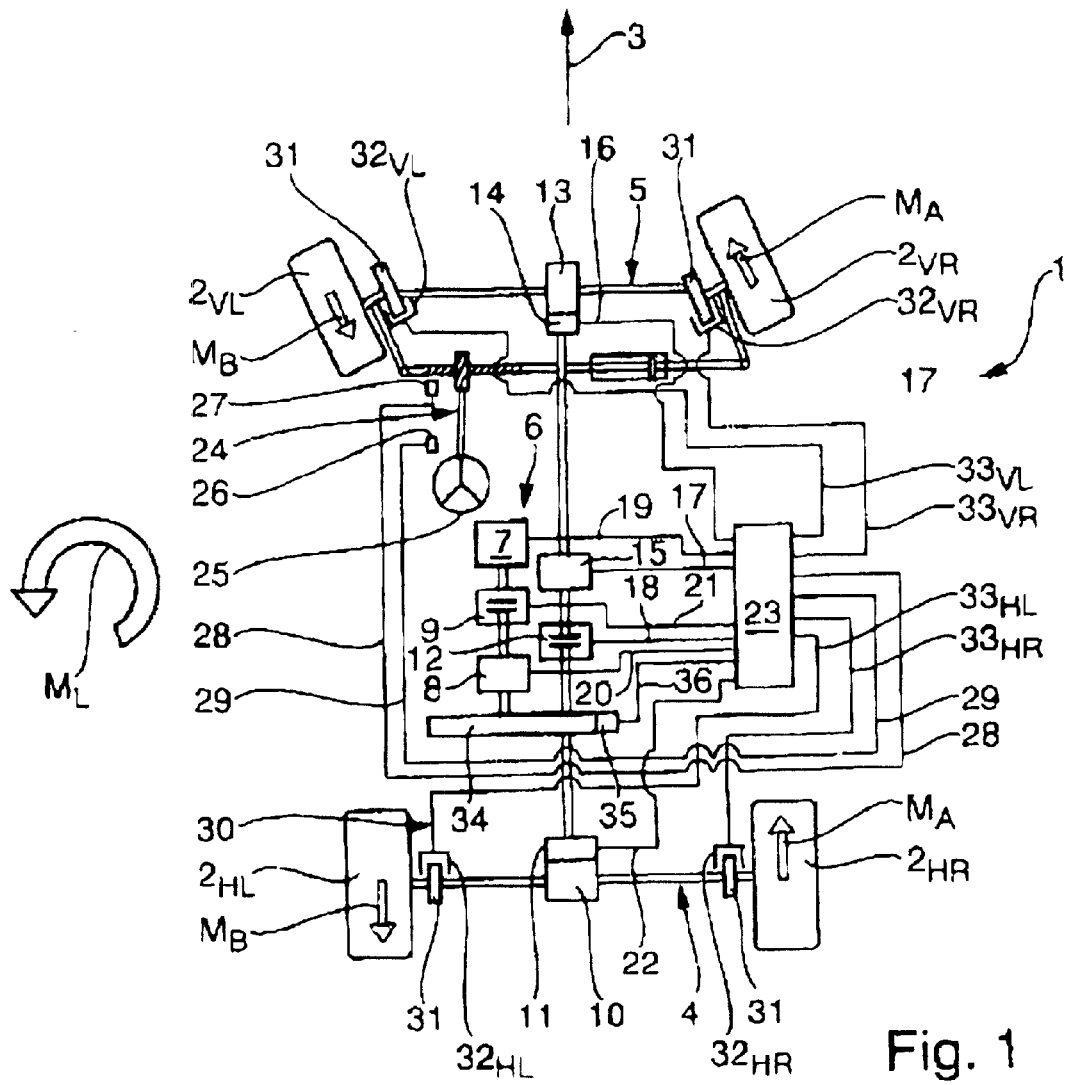
FIG. 1 is a schematic view of a vehicle according to the present invention.

As illustrated in FIG. 1, a vehicle 1, configured, for example, as a passenger car, includes four wheels 2, which are indexed according to their arrangement with respect to a travel direction 3 indicated by an arrow as follows: wheel $2_{VL}$ designates the front left wheel; wheel $2_{VR}$ designates the front right wheel; wheel $2_{HL}$ designates the rear left wheel; and wheel $2_{HR}$ designates the rear right wheel.

In the example embodiment illustrated in FIG. 1, vehicle 1 includes a rear axle 4 configured as a drive axle and a front axle 5 which may also be used as a drive axle. Rear axle 4 may be permanently used as a drive axle, while front axle 5 may be added as a drive axle as needed. However, a reverse or variable configuration or other all-wheel variations are also possible. The present invention also may operate in a vehicle having only one drive axle.

A power train 6 which transfers the engine torques from an engine 7 to rear axle 4 via a clutch 9 and a transmission 8 is provided to drive drive axles 4 and 5. The torque is transmitted to rear axle 4 via an axle differential 10, which may be equipped with a differential lock 11. Torque is similarly transmitted to front axle 5 via an additional clutch 12 and an axle differential 13. This axle differential 13 may also be equipped with a differential lock 14. Furthermore, an additional transmission 15 may be arranged on the side of power train 6 associated with front axle 5. In the example embodiment illustrated in FIG. 1, the individual components of power train 6 are controllable, with appropriate conductors 16, 17, 18, 19, 20, 21, 22 being connected to a control system 23 which cooperates with power train 6 to operate and control components of power train 6. Control system 23 may include a plurality of controllers or the like, which are connected via appropriate links to form a system, which is symbolically indicated as a rectangle for the purpose of simplification.

The conductors include signal lines for transmitting signals and/or control lines for transmitting control commands.

The torque or rotational speed is distributed between front axle 5 and rear axle 4 by a center differential 34, which may also include a differential lock 35, which may be operated by control system 23 via a control line 36.

Vehicle 1 is also equipped with a steering system 24, which includes a manual steering device 25 configured as a steering wheel and is used for steering front wheels $2_{VL}$ and $2_{VR}$. Steering system 24 may be a conventional steering system, as schematically illustrated, having a positive mechanical coupling between manual steering device 25 and steered vehicle wheels $2_{VL}$, $2_{VR}$. However, a steering system is also possible in which a controlled system forms an electronic link between the manual steering device and the steerable wheels (steer-by-wire steering). Steering system 25 is capable of detecting a steering angle set by the driver using manual steering device 25, for example, via wheel speed sensors or via a steering angle sensor 26. In addition or as an alternative, another steering angle sensor 27 may also be provided, which is associated with steerable wheels $2_{VL}$ and $2_{VR}$ and detects the steering angle set on the steerable wheels. Steering angle sensors 26 and/or 27 are connected to control system 23 via appropriate signal lines 28 and/or 29.

Furthermore, vehicle 1 is equipped with a brake system 30, which is schematically illustrated in a simplified manner by four brake disks 31 each associated with one wheel 2 and by four brake units 32 which cooperate with brake disks 31 and are each associated with one of wheels 2. The individual brake units 32 are connected to control system 23 via electrical, hydraulic, or pneumatic control lines 33. For clarity, the individual brake units 32 and the respective control lines 33 are indexed like the respective wheels 2. These control lines 33 may be the control lines which are present in the vehicle in the service brake system. Brake units 32 may be conventional hydraulic brake units with hydraulic control lines 33 operating brake units 32. Other components of the respective hydraulic system are not illustrated for simplicity. In another example embodiment, brake units 32 may also be electrohydraulically operated, in which case electrical control lines 33 may operate brake units 32 directly by building up a hydraulic brake pressure. Furthermore, electromechanical brake units 32 may also be provided, in which the braking torque is generated by an electric motor drive, for example. Also in this case, brake units 32 may be operated directly via electrical control lines 33. The same holds true for compressed air brakes.

Vehicle 1 according to the present invention operates as follows:

If the driver sets a steering angle on steerable wheels $2_{VL}$ and $2_{VR}$ via steering wheel 25, this may be detected by control system 23 via steering angle sensor(s) 26 or 27, for example. Control system 23 also permanently monitors the vehicle velocity, this information being available, for example, from conventional wheel sensors (e.g., of an antilock brake system), etc. Provided the vehicle has a velocity that is less than a predefined limit velocity of 30 km/h, for example, and as soon as set steering angle 25 reaches and exceeds a predefined limit value of, for example, 50% of the maximum steering angle, control system 23 activates brake unit 32 of drive axle wheel 2 inside the curve. In the example embodiment illustrated, the vehicle is to take a leftward turn in the forward direction. Since rear axle 4 represents the drive axle of vehicle 1, the rear left wheel $2_{HL}$ is braked correspondingly. By braking wheel $2_{HL}$ a braking torque $M_B$, is generated on it, which is symbolized in FIG. 1 by a backward pointing arrow on wheel $2_{HL}$. This braking torque $M_B$ generates a steering torque $M_L$ directed leftward with respect to the vertical axis of vehicle 1, which supports the steering action. This torque is indicated by an arrow on the left next to the vehicle.

In addition, control system 23 of the example embodiment illustrated is responsible for an additional drive torque $M_A$ being transferred to wheel $2_{HR}$ outside the curve of driven rear axle 4, whereby additional steering support is achieved. Additional drive torque $M_A$ in wheel $2_{HR}$ is symbolized by a forward pointing arrow. Control system 23 monitors, via lines 20 and 21, the instantaneous states of transmission 8 and clutch 9. If clutch 9 is disengaged, control system 23 causes clutch 9 to engage. If the transmission is in neutral, control system 23 operates transmission 8 so that an appropriate gear is engaged. In order to generate this additional drive torque $M_A$, control system 23 activates clutch 9 and transmission 8 in an appropriate manner so that an appropriate drive torque may be introduced in wheel $2_{HR}$ outside the curve via axle differential 10. The engine torque may also be additionally enhanced.

In the example embodiment illustrated, a brake intervention is thus performed on respective wheels 2 as a function of the status of clutch 9 and transmission 8. In another example embodiment, which has no transmission 8 that may be controlled by control system 23, the brake intervention may also be performed as a function of the status in that the intensity of brake operation depends on whether or not a gear is engaged. The same holds true for an example embodiment which has no clutch 9 that may be controlled by control system 23. Also in that case, the intensity the respective brake of intervention may depend on whether or not the clutch is engaged.

If a differential lock 11 is available and activated, it is deactivated via control system 23 in order to generate additional steering torque $M_L$. In the case of an automatic transmission, clutch 9 may be formed by a torque converter lockup clutch of the automatic transmission.

Additional drive torque $M_A$ introduced at wheel $2_{HR}$ outside the curve may be selected so that a loss of propulsion caused by the one-sided brake intervention is compensated.

In addition to wheel $2_{HL}$ inside the curve of driven rear axle 4, wheel $2_{VL}$ inside the curve of non-driven front axle 5 may also be braked, whereby a braking torque $M_B$ is also generated at this wheel. Wheel $2_{HL}$ inside the curve of drive axle 4 may be braked stronger than wheel $2_{VL}$ inside the curve of non-driven axle 5.

In vehicle 1 illustrated, which is equipped with an activatable front-axle drive, the front-axle drive may also be switched on in order to enhance steering torque $M_L$, which may be achieved, for example, by appropriate operation of clutch 12 by control system 23. Also in this case, a drive torque $M_A$ is generated on the wheel outside the curve of front axle 5 via power train 6 and axle differential 13. The intensity of this drive torque depends in particular on the status of transmission 15. If a differential lock 14 is present, control system 23 is responsible for there being no lockup of axle differential 13 of front axle 5 in order to generate drive torque $M_A$ on front axle 5.

In order to achieve a constant speed distribution at both drive axles 4 and 5 when the front drive is switched on, control system 23 may be configured so that it activates differential lock 35 of the center differential.

If vehicle 1 is equipped with a clutch 9, 12 which is disengaged in those operating conditions that require no drive power, for example, coasting, i.e., permit no direct transmission of torque between engine 7 and drive axle, control system 23 operates clutch 9, 12 to engage it in order to achieve a steering torque $M_B$, so that a drive torque $M_A$ may be transmitted to wheel 2 outside the curve via axle differential 10, 13 of the drive axle. The absolute value of this drive torque $M_A$ is in particular at least equal to braking torque $M_B$ generated at wheel 2 inside the curve of these drive axles 4, 5. This control system 23 may also check whether a gear is engaged in order to engage another gear prior to engaging the clutch.

Control system 23 may activate engine 7 and the respective clutch 9 and/or 12 so that the driving operation intended by the driver, produced, for example, via the gas pedal position, is maintained constant, i.e., without perceptible jumps. This means that, for example, drive torque $M_A$, generated additionally on wheel(s) 2 outside the curve is such that a vehicle deceleration caused by the steering-supporting braking is compensated and thus avoided. This may take place, for example, by increasing the engine torque generated by engine 7 accordingly. If control system 23 engages clutch 8 and/or 12 to generate a drive torque $M_A$, a drag torque may be transmitted from engine 7 to the drive axle due to the drive operation intended by the driver. In order for this not to result in an undesired deceleration of vehicle 1, control system 23 may compensate for such a braking action by appropriately activating engine 7.

Depending on the safety philosophy pursued by the vehicle manufacturer, control system 23 may activate engine 7 and the respective clutch 9 and/or 12 so that the amount of additional drive torque $M_A$ generated depends on the intensity of operation of brake system 30 to reduce the velocity of the vehicle. For example, it may be useful if no or only reduced additional drive torque $M_A$ is generated at the wheels outside the curve, starting from a predefined value of braking deceleration of the vehicle which is initiated by the driver correspondingly actuating the brake pedal, in order not to extend the required over all braking distance in this manner.

Control system 23 may act upon brake system 30 and power train 6 so that the amount of steering-supporting braking torque $M_B$ and/or of steering-supporting drive torque $M_A$ depend on the operating parameters of vehicle 1. These operating parameters may be the vehicle velocity and/or the vehicle acceleration and/or the steering angle and/or the direction of travel, for example. Different steering torques may be generated for slow travel, crawling speed, and maneuvering operation. It could also be useful to deactivate single-sided steering-supporting brake operation when reversing.

What is claimed is:

1. A vehicle, comprising:
   at least four wheels;
   at least one drive axle;
   a vehicle engine;
   a power train connecting the vehicle engine to the drive axle, the power train including at least one transmission, at least one clutch and at least one axle differential;
   a brake system configured to brake at least the wheels associated with the drive axle independently of other wheels;
   a steering system having a manual steering device configured to set a steering angle for steerable wheels; and
   a control system configured to determine a need for steering support below a predefined vehicle velocity and as of a predefined steering angle, to brake at least the drive axle wheel inside a curve, to generate a steering-supporting braking torque on the drive axle wheel, to monitor a status of at least one of the transmission and the clutch and to actuate the brakes of an appropriate wheel as a function of the status to generate the steering-supporting braking torque.

2. The vehicle according to claim 1, wherein the manual steering device includes a steering wheel.

3. The vehicle according to claim 1, wherein the control system is configured to control the clutch and to cause the clutch to be engaged if the clutch is disengaged and a need for steering support is determined.

4. The vehicle according to claim 3, wherein the control system is configured to control the transmission and to cause a gear to be engaged if the transmission is in a neutral position and a need for steering support is determined.

5. The vehicle according to claim 4, wherein the control system is configured to activate the transmission and the clutch if a need for steering support is determined so that steering-supporting drive torque is generated on the drive axle wheel outside the curve.

6. The vehicle according to claim 5, wherein the control system is configured to activate the engine, the transmission and the clutch in order to support steering so that an absolute value of a drive torque is approximately equal to an absolute value of the braking torque.

7. The vehicle according to claim 1, wherein the vehicle includes one of a front wheel drive, a rear wheel drive and an all-wheel drive.

8. The vehicle according to claim 1, wherein the vehicle includes a front wheel drive.

9. The vehicle according to claim 1, wherein the vehicle includes a rear wheel drive.

10. The vehicle according to claim 1, wherein the vehicle includes an all-wheel drive.

11. The vehicle according to claim 1, wherein the control system is configured to brake the wheel inside the curve of at least one non-driven axle to generate a steering-supporting braking torque thereon.

12. The vehicle according to claim 1, wherein the control system is configured to activate the engine, the transmission and the clutch to support steering so that a variation of a sum of drive torque generated on the drive axle wheels over time is constant.

13. The vehicle according to claim 1, wherein the control system is configured to activate the engine, the transmission and the clutch to support steering so that drive torque is generated in accordance with an extent of operation of the brake system intended to reduce a vehicle speed.

14. The vehicle according to claim 1, wherein the control system is configured to activate the engine, the transmission and the clutch to support steering so that at least one of steering-supporting braking torque and steering-supporting drive torque depends on at least one operating parameter of the vehicle.

15. The vehicle according to claim 14, wherein the at least one operating parameter includes at least one of vehicle velocity, vehicle acceleration, steering angle and direction of travel.

16. The vehicle according to claim 14, wherein the at least one operating parameter includes vehicle velocity.

17. The vehicle according to claim 14, wherein the at least one operating parameter includes vehicle acceleration.

18. The vehicle according to claim 14, wherein the at least one operating parameter includes steering angle.

19. The vehicle according to claim 14, wherein the at least one operating parameter includes direction of travel.

20. The vehicle according to claim 1, wherein the axle differential includes a controllable differential lock, the control system being configured to operate the differential lock to unlock the axle differential to generate steering-supporting drive torque.

21. The vehicle according to claim 1, further comprising an activatable additional drive axle, the control system being configured to activate the additional drive axle, to generate steering-supporting braking torque on the drive axle wheels inside the curve and to generate steering-supporting drive torque on the drive axle wheels outside the curve to achieve steering support.

22. The vehicle according to claim 21, further comprising a center differential configured to distribute rotational speed between a driven front axle and a driven rear axle, the center differential including a differential lock, the control system being configured to operate the differential lock to lock the center differential and generate steering-supporting drive torque.

23. The vehicle according to claim 1, further comprising a traction control device, the control system being integrated into at least one of hardware and software of the traction control device.

24. The vehicle according to claim 23, wherein the traction control device includes at least one of an antilock brake system arrangement, an antispin regulation arrangement and an electronic stability program arrangement.

25. The vehicle according to claim 23, wherein the traction control device includes an antilock brake system arrangement.

26. The vehicle according to claim 23, wherein the traction control device includes an antispin regulation arrangement.

27. The vehicle according to claim 23, wherein the traction control device includes an electronic stability program arrangement.

* * * * *

UNITED STATES PATENT AND TRADEMARK OFFICE
CERTIFICATE OF CORRECTION

| | | |
|---|---|---|
| PATENT NO. | : 6,588,858 B2 | Page 1 of 1 |
| DATED | : July 8, 2003 | |
| INVENTOR(S) | : Ritz et al. | |

It is certified that error appears in the above-identified patent and that said Letters Patent is hereby corrected as shown below:

Column 1, please move line 5 through line 11, "One advantage of the arrangement . . ." to Column 7, and insert them as a new paragraph at line 3.

Column 6,
Line 57, please delete "over all" and insert -- overall --.

Signed and Sealed this

Twentieth Day of January, 2004

JON W. DUDAS
*Acting Director of the United States Patent and Trademark Office*